(12) United States Patent
Bennett et al.

(10) Patent No.: US 10,094,513 B2
(45) Date of Patent: Oct. 9, 2018

(54) QUICK RELEASE BITE MOUNT

(71) Applicant: GoPro, Inc., San Mateo, CA (US)

(72) Inventors: Eric McCallister Bennett, Foster City, CA (US); Travis Eastman Pynn, Moss Beach, CA (US); Nicholas D. Woodman, Woodside, CA (US); Joshua Todd Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 62 days.

(21) Appl. No.: 14/693,864

(22) Filed: Apr. 22, 2015

(65) Prior Publication Data

US 2015/0316205 A1    Nov. 5, 2015

Related U.S. Application Data

(60) Provisional application No. 61/988,891, filed on May 5, 2014.

(51) Int. Cl.
| | |
|---|---|
| *F16M 13/04* | (2006.01) |
| *F16M 11/04* | (2006.01) |
| *F16M 13/00* | (2006.01) |
| *F16M 13/02* | (2006.01) |
| *G03B 17/56* | (2006.01) |

(52) U.S. Cl.
CPC .......... *F16M 13/04* (2013.01); *F16M 11/041* (2013.01); *F16M 13/00* (2013.01); *F16M 13/022* (2013.01); *G03B 17/561* (2013.01); *G03B 17/563* (2013.01); *G03B 17/566* (2013.01)

(58) Field of Classification Search
CPC ............ A63B 71/085; A63B 2071/086; G03B 17/561
USPC ........................................................ 224/181
See application file for complete search history.

(56) References Cited

U.S. PATENT DOCUMENTS

| | | | |
|---|---|---|---|
| 2,651,981 A * | 9/1953 | Calhoun ................ | F16M 13/04 206/820 |
| 3,762,797 A | 10/1973 | Heller | |

(Continued)

OTHER PUBLICATIONS

PCT International Search Report and Written Opinion for PCT/US2015/028377, dated Jul. 24, 2015, 16 Pages.

(Continued)

*Primary Examiner* — Adam Waggenspack
(74) *Attorney, Agent, or Firm* — Young Basile Hanlon & MacFarlane, P.C.

(57) ABSTRACT

The quick release bite mount comprises a quick release coupler portion and a malleable overmold that allows a user to bite down on the mount when a user holds the mount with a mouth. The overmold part of the mount can be a material such as rubber, plastic, or gel based structure. The overmold has an outer ridge that can hang from teeth of a user, allowing the user to relax their jaw during use. The plastic part of the mount has a thin, flexible area that the rubber part is overmolded over. This adds stiffness to the malleable area, while still allowing it to flex. The mount is configured to mechanically couple with a camera (or camera housing). The camera can be coupled to the mount such the camera can capture images in an unobstructed field of view when the mount is gripped in the mouth of a user.

17 Claims, 12 Drawing Sheets

(56) References Cited

U.S. PATENT DOCUMENTS

| | | | | |
|---|---|---|---|---|
| 5,336,086 A | * | 8/1994 | Simmen | A61C 9/0006 433/37 |
| D363,562 S | * | 10/1995 | Schildt | D26/39 |
| 5,485,357 A | * | 1/1996 | Zolninger | A61F 4/00 362/103 |
| 9,395,603 B2 | | 7/2016 | Achenbach | |
| D780,249 S | | 2/2017 | Ramsthaler | |
| 2012/0017922 A1 | * | 1/2012 | Hirshberg | A63B 71/085 128/861 |
| 2012/0312309 A1 | * | 12/2012 | Zimmerman | A63B 71/085 128/861 |
| 2013/0148951 A1 | * | 6/2013 | Zhang | G03B 17/00 396/428 |
| 2013/0263865 A1 | * | 10/2013 | Khast | A61F 5/566 128/848 |
| 2014/0105589 A1 | * | 4/2014 | Samuels | F16F 7/00 396/421 |
| 2015/0040917 A1 | * | 2/2015 | Gottsch | A63B 71/085 128/862 |
| 2015/0253651 A1 | * | 9/2015 | Russell | G03B 17/561 224/181 |
| 2015/0312446 A1 | * | 10/2015 | Blackman | H04N 5/2252 348/373 |

OTHER PUBLICATIONS

Pro Standard, "The Grill Mount Multi-Function Mouth Mount," Date unknown, 8 Pages, [online] [Retrieved on Jul. 25, 2017] Retrieved from the internet <URL:https://www.prostandard.com/collections/pro-standard/products/the-grill-mount?variant=7683423299>.

Instagram Account for "mygomount", First post uploaded on Mar. 19, 2017, 3 Pages, [online] [Retrieved on Jul. 25, 2017] Retrieved from the internet <URL:https://www.instagram.com/mygomount/?hl=en>.

* cited by examiner

QUICK RELEASE BITE MOUNT

CROSS REFERENCE TO RELATED APPLICATIONS

This application claims the benefit of U.S. Provisional Application No. 61/988,891, filed May 5, 2014, which is incorporated by reference in its entirety.

BACKGROUND

1. Field of Art

The disclosure generally relates to the field of mounts, for example, camera mounts.

2. Description of the Related Art

In certain sports, especially surfing, it is useful to hold an action sports camera in a mouth of a user. This frees up hands of the user and gives the user a unique image (still picture or video) shot angle from the point of view of that user. However, when the user no longer wants to hold the camera in the mouth, it is helpful to be able to lock the camera into a fixed mount, such as a surf mount attached to the front of a surfboard. This way the user can keep filming themselves from a new perspective, and not worry about losing their action sports camera.

BRIEF DESCRIPTION OF DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The quick release bite mount comprises a plastic quick release coupler portion and a malleable overmold that allows a user to bite down on the mount when a user holds the mount with a mouth. The rubber part of the mount has an outer ridge that can hang from teeth of a user, allowing the user to relax their jaw during use. The plastic part of the mount has a thin, flexible area that the rubber part is overmolded over. This adds stiffness to the rubber area, while still allowing it to flex. The mount is configured to mechanically couple with a camera. The camera can be mounted such that the camera can capture images in an unobstructed field of view when the mount is gripped in the mouth of a user.

Bite Mount Structure

Figure 1:
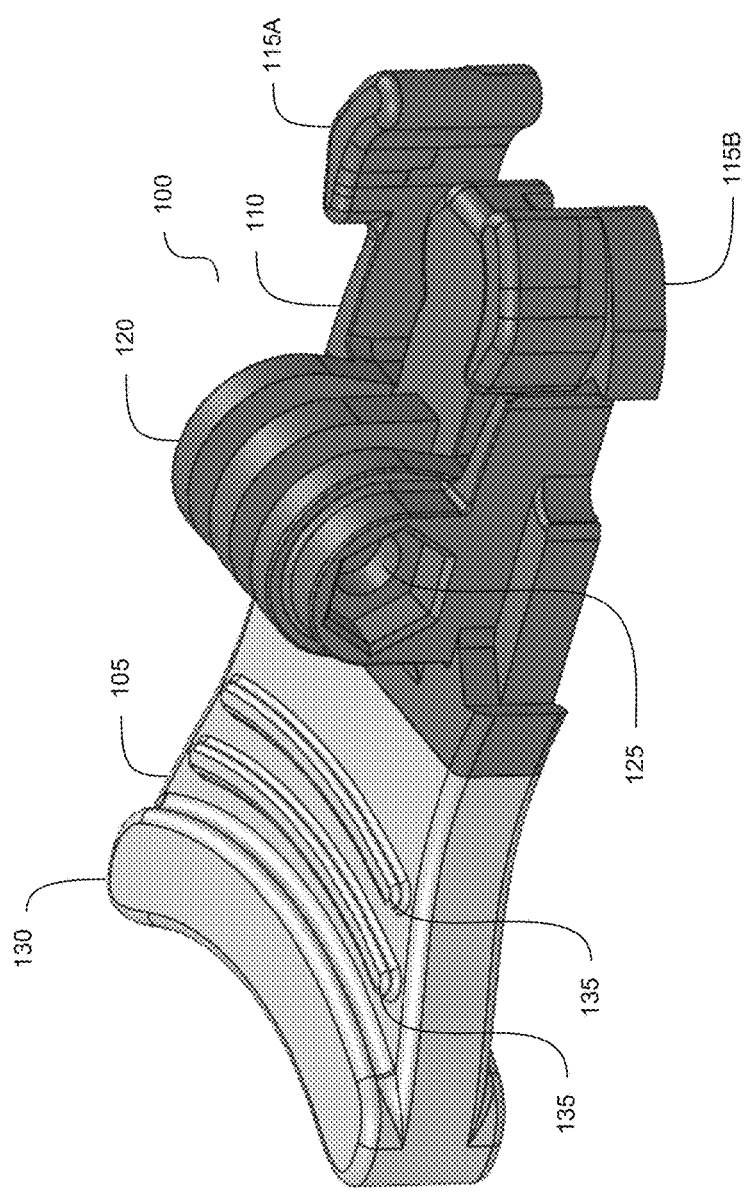
FIG. 1 illustrates one example embodiment of a quick release bite mount.

FIG. 1 illustrates one example embodiment of a quick release bite mount (hereinafter referred to as bite mount) 100. The bite mount 100 includes an overmold 105 and a quick release coupler portion 110. The overmold 105 comprises a receiving plate that can be received within the mouth of a user. In addition, the overmold 105 can be a material such as a food safe rubber, a food safe thermoplastic elastomer (TPE) or other food safe plastic material. For ease of discussion, the description will be provided in the context of a rubber overmold 105.

Figure 7:
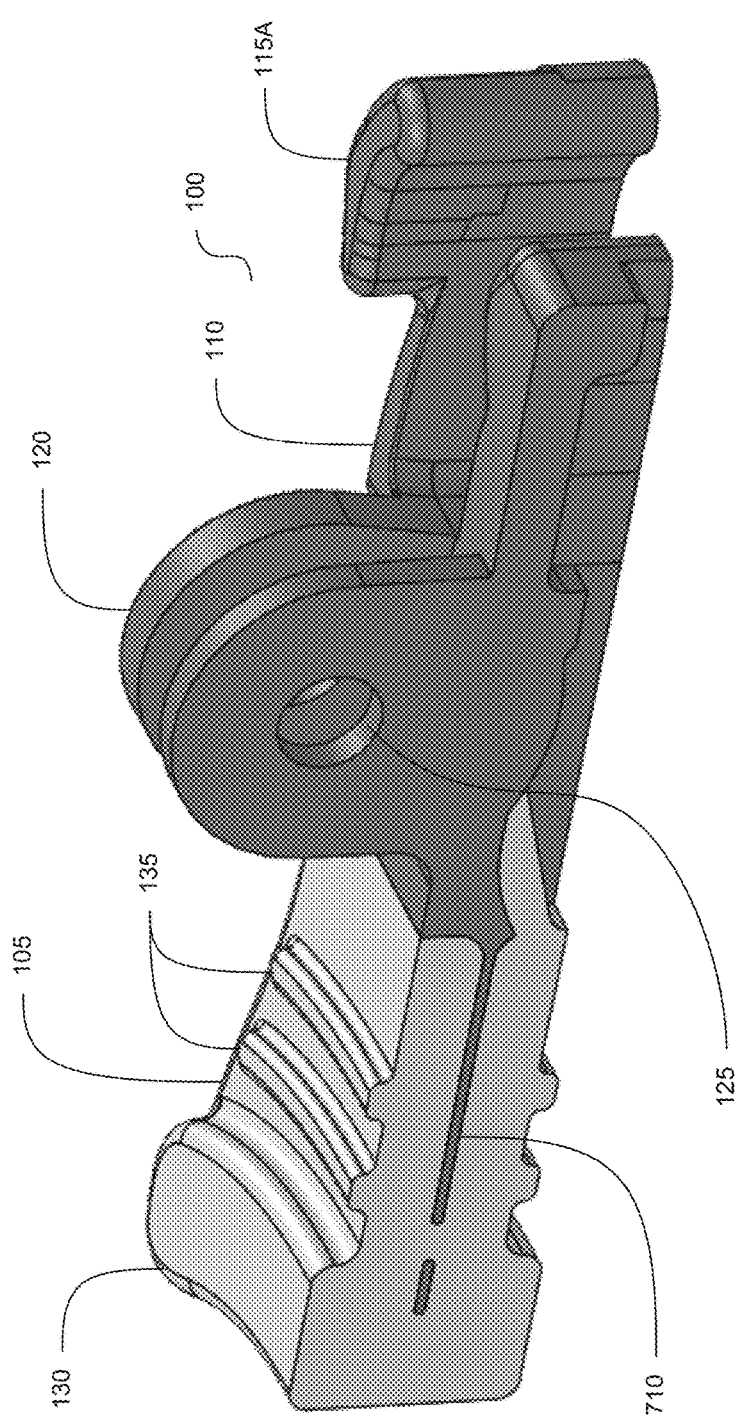
FIG. 7 illustrates a vertical cross section of a quick release bite mount.
Figure 8:
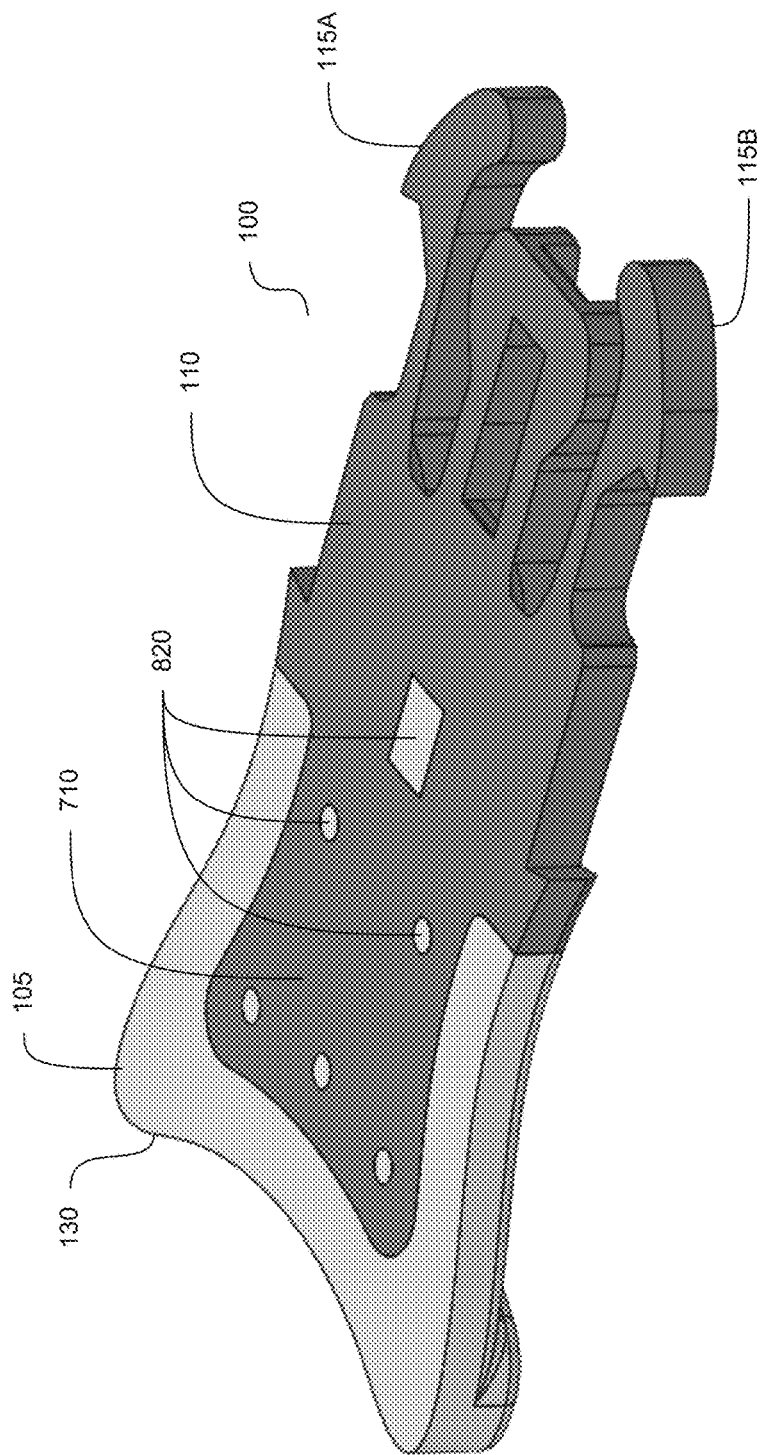
FIG. 8 illustrates a horizontal cross section of a quick release bite mount.

Referring briefly to FIG. 7, it illustrates a vertical cross section of the bite mount 100. In addition, FIG. 8 illustrates a horizontal cross section of the bite mount 100. As illustrated in these drawings, note that the quick release coupler portion 110 is structured in this example as a unitary body construction. At one end 710 of the unitary body construction is where the rubber overmold 105 is structured around such end 710. The unitary body construction can be any substantially rigid material such as plastic or other polycarbonate or a light metal. The rubber overmold 105 can be secured to the one end of the unitary body constructed 710 portion of the bite mount 100 by, for example, molding holes 820 or an adhesive or some other securing options. It is noted that the rubber overmold 105 may be shaped a recessed channel that is structured or receive teeth of a user.

Referring back to FIG. 1, the quick release coupler portion 110 includes a device coupler. The device coupler is configured to releasably couple with a device such as a camera or audio recorder. In one example, the device coupler can include two or more protruding fingers 120 with an opening 125 through them through which a bolt (not shown) passes through to couple with a nut (not shown). The quick release coupler portion 110 also includes a mating coupler. In one example, the mating coupler can include two arms 115A, 115B that couple with a reciprocal buckle receiving portion. It is noted that although bite mount 100 illustrates two couplers (e.g., device coupler and mating coupler, both of which are releasable), the bite mount 100 can include other quick release couplers to connect that allow for releasably coupling with cameras, mounts and/or other accessories.

The rubber overmold 105 includes one or more inner ridges 135 and an outer ridge 130. The inner ridges 135 can be on both the top and bottom parts of the rubber overmold 105 of the bite mount 100. The rubber overmold 105 is noted to be rubber, but can be any other malleable overmold (e.g., a gel based overmold or a plastic overmold). The overmold 105 provides stiffness (or rigidity), yet has some flex to it (e.g., when bitten down on).

Figure 2:
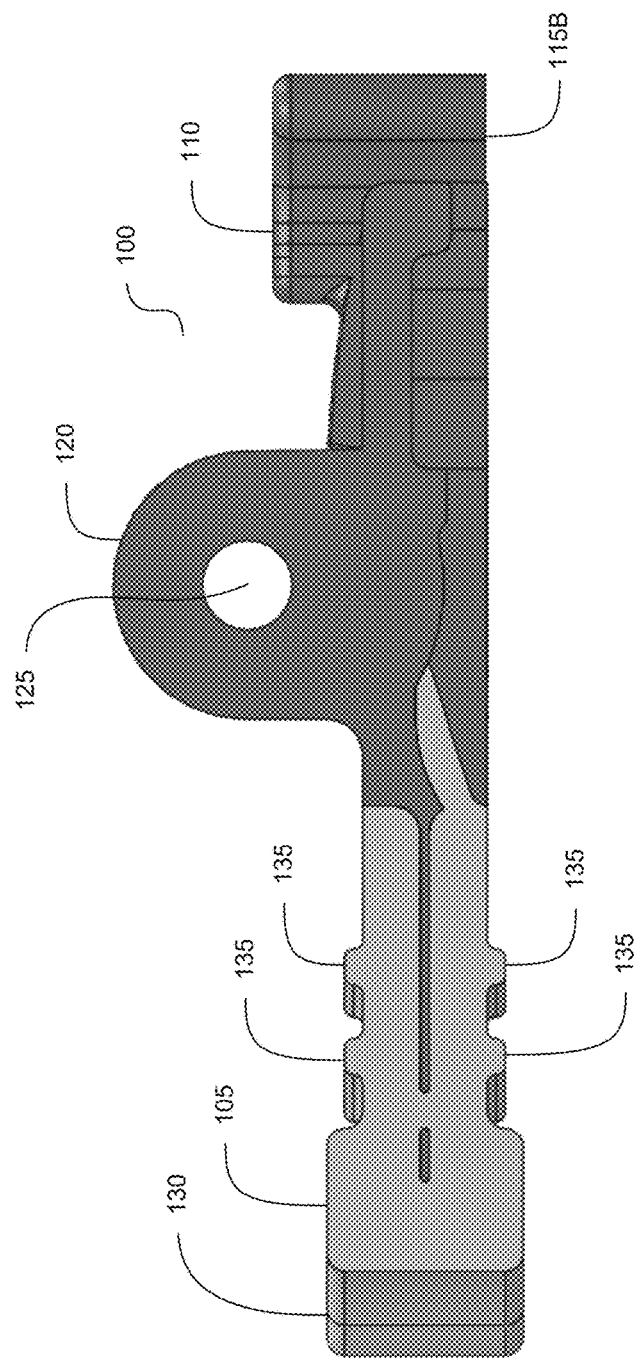
FIG. 2 illustrates one example embodiment of a side view of a quick release bite mount.

FIG. 2 illustrates one example embodiment of a side cross sectional view of a quick release bite mount 100. The rubber overmold 105 is shown surrounding one end of a unitary body quick release coupler portion 110. In this view, the outer ridge 130 extends both above and below the plane of the bite mount 100. In addition, the inner ridges 135 are shown on both the top and bottom parts of the rubber overmold 105 of the bite mount 100. The outer ridge 130 (which also can be viewed as two ridges—top and bottom) and the inner ridges 135 are structured such that when this portion of the bite mount 100 is within a user mouth (e.g., as further shown in FIG. 6), the user can use their teeth to grip the bite mount 100 and hold it in place.

In one example, the height of the outer ridge 130 and the inner ridges 135 may only be a few millimeters. In addition, the spacing between the ridges 130, 135 in the horizontal plane also may be a few millimeters. The ridges 130, 135 themselves also may be a few millimeters in width. For example, the outer ridge 130 may be 5 to 10 millimeters (mm) in width and each inner ridge 135 may be 2 to 5 mm in width. The spacing between the ridges 130, 135 may be 2 to 6 mm. Overall, the structure is small enough to fit within the user mouth, but also configured to provide gripping surfaces for the teeth using the ridges 130, 135 or the space between the ridges 130, 135. In addition, it is noted that the rubber overmold 105 may itself be formed in a mold in which the various ridges are pre-structured for the mold.

Figure 3:
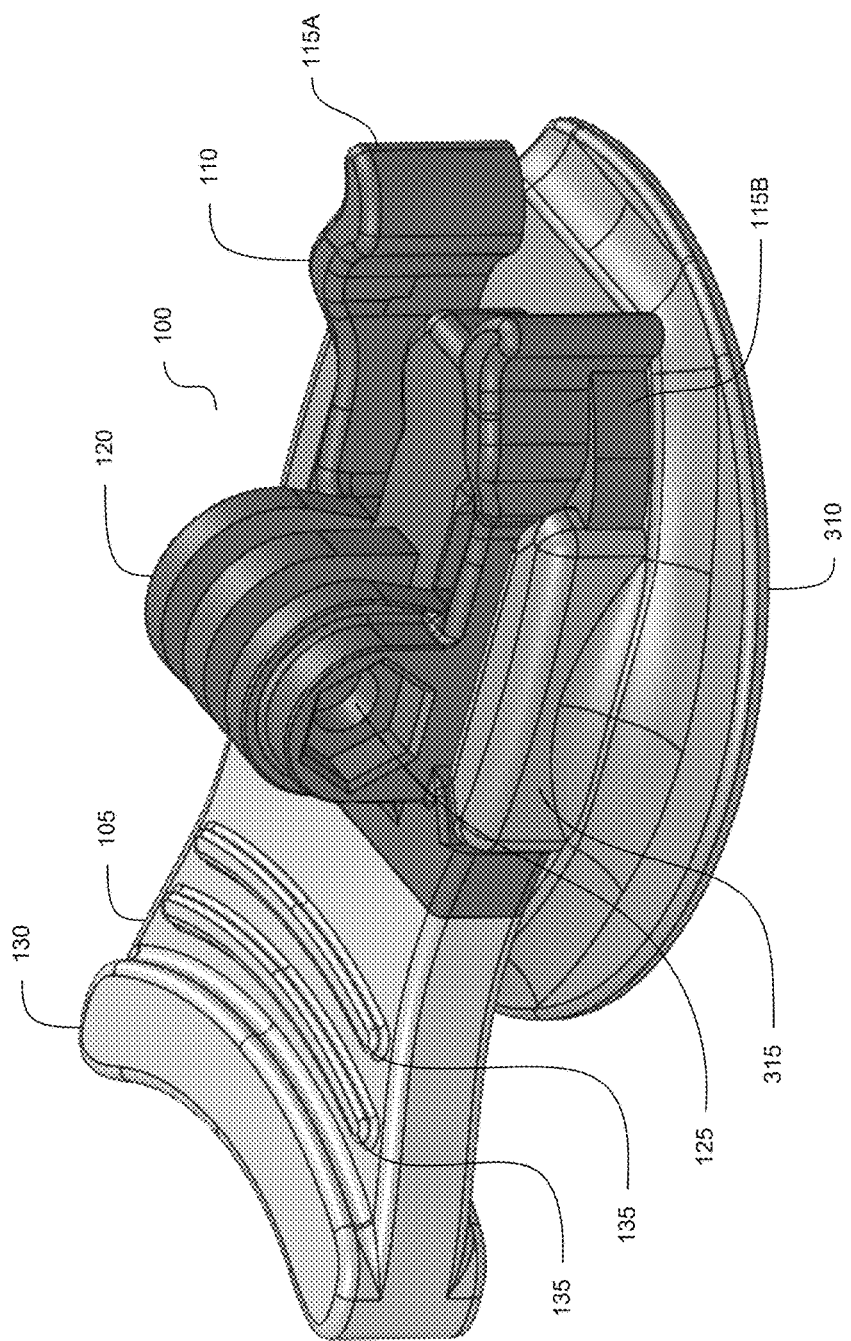
FIG. 3 illustrates one example embodiment of a quick release bite mount coupled with a board mount.

Turning now to FIG. 3, it illustrates one example embodiment of a quick release bite mount 100 coupled with a board mount 310. In this example, the board mount 310 is a surfboard mount that can be secured to a surfboard. Alternately, the board mount 310 can be configured to couple with other sporting goods such as boogie boards, skis, snowboard, bicycles, and the like. The board mount 310 includes reciprocal buckle receiving portion 315 through which the arms 115A, 115B of the quick release coupler portion 110 passes through to secure the bite mount 100 to the board mount 310. It is noted this configuration is illustrative of an example benefit of the quick release bite mount 100 in that it can mechanically couple with other components through its arms 115A, 115B sliding through and locking with the reciprocal receiving portion 315. The arms 115A, 115B can be bent towards each other to release and slide away from the reciprocal receiving portion 315 when it is desired to release the bite mount 100. It is noted that in this example, the arms 115A, 115B form a first portion of a releasable coupler that couples with a second portion of a releasable coupler, which in this example is the reciprocal buckle receiving portion 315. It also is noted that the quick release coupler is shown in the context of a buckle for ease of explanation in this example, but that other forms of quick release couplers also may be used such as ball and socket joints.

Figure 4:
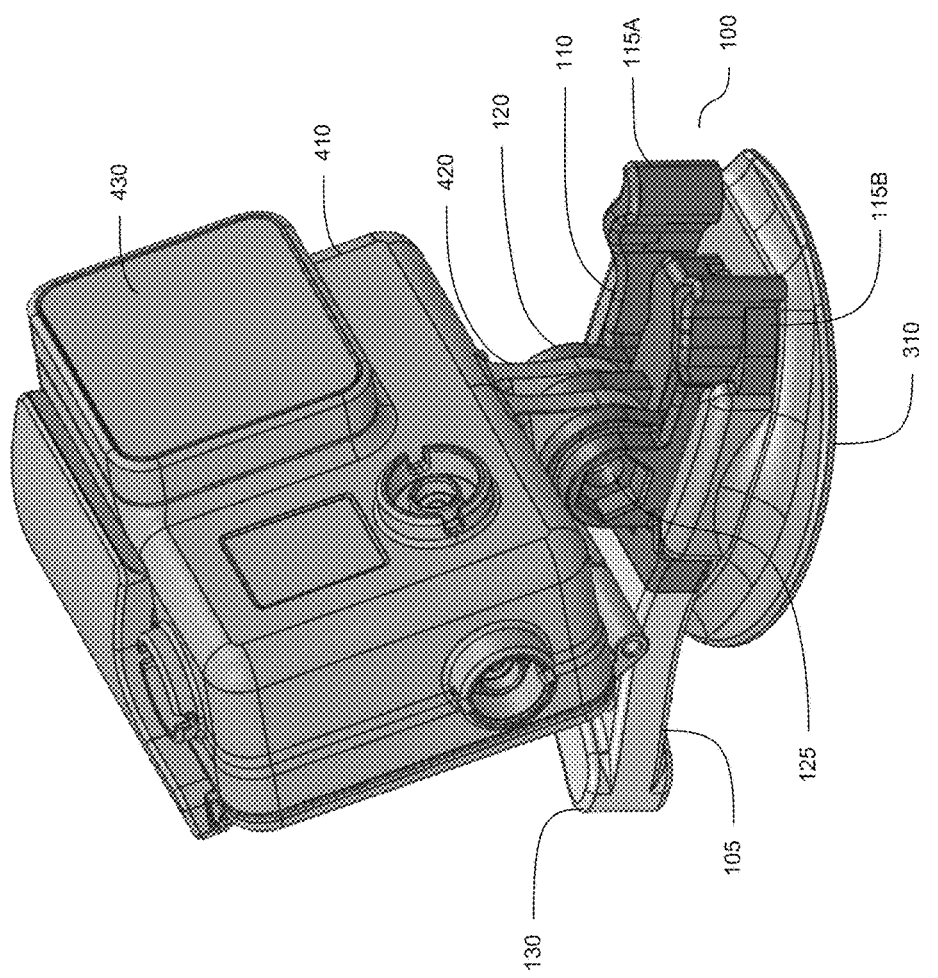
FIG. 4 illustrates one example embodiment of a camera and a board mount coupled with the quick release bite mount.

FIG. 4 illustrates one example embodiment of a camera 410 and the board mount 310 coupled with the bite mount 100. In this example the camera 410 (which includes a lens (or area where lens is received) 430 to capture a field of view), or the housing within which the camera is, includes protruding fingers 420 that reciprocally fit with the protruding fingers 120 of the bite mount 100. Both sets of protruding fingers have holes that align to fit a bolt assembly (not shown) through opening 125 that locks with a nut on end so that the camera 410 can be secured to the bite mount 100. The entire bite mount assembly including camera 410 coupled with bite mount 100 couples with the board mount 310 as described with FIG. 3. It is noted this configuration is illustrative of another example benefit of the quick release bite mount 100. Here, in addition to mechanically coupling with other components through its arms 115A, 115B, it illustrates an example benefit of mechanically coupling the camera 410. The camera can be further secured with a screw mechanism (not shown) that traversed through the opening 125.

FIGS. 5A and 5B illustrate an example embodiment of the camera 410 coupled with the bite mount 100. In this configuration, note that the bite mount 100 appears in an upside down configuration, in contrast to the right-side up configuration shown relative to the board mount 310 in FIG. 4. In this example configuration, the bite mount 100 is configured for securing the rubber overmold 105 in a mouth of a user (e.g., with teeth in the mouth gripping the area around the ridges 135). Further, the camera 410 is mechanically coupled so that the lens 430 is able to capture the field of view away from the user.

Figure 5:
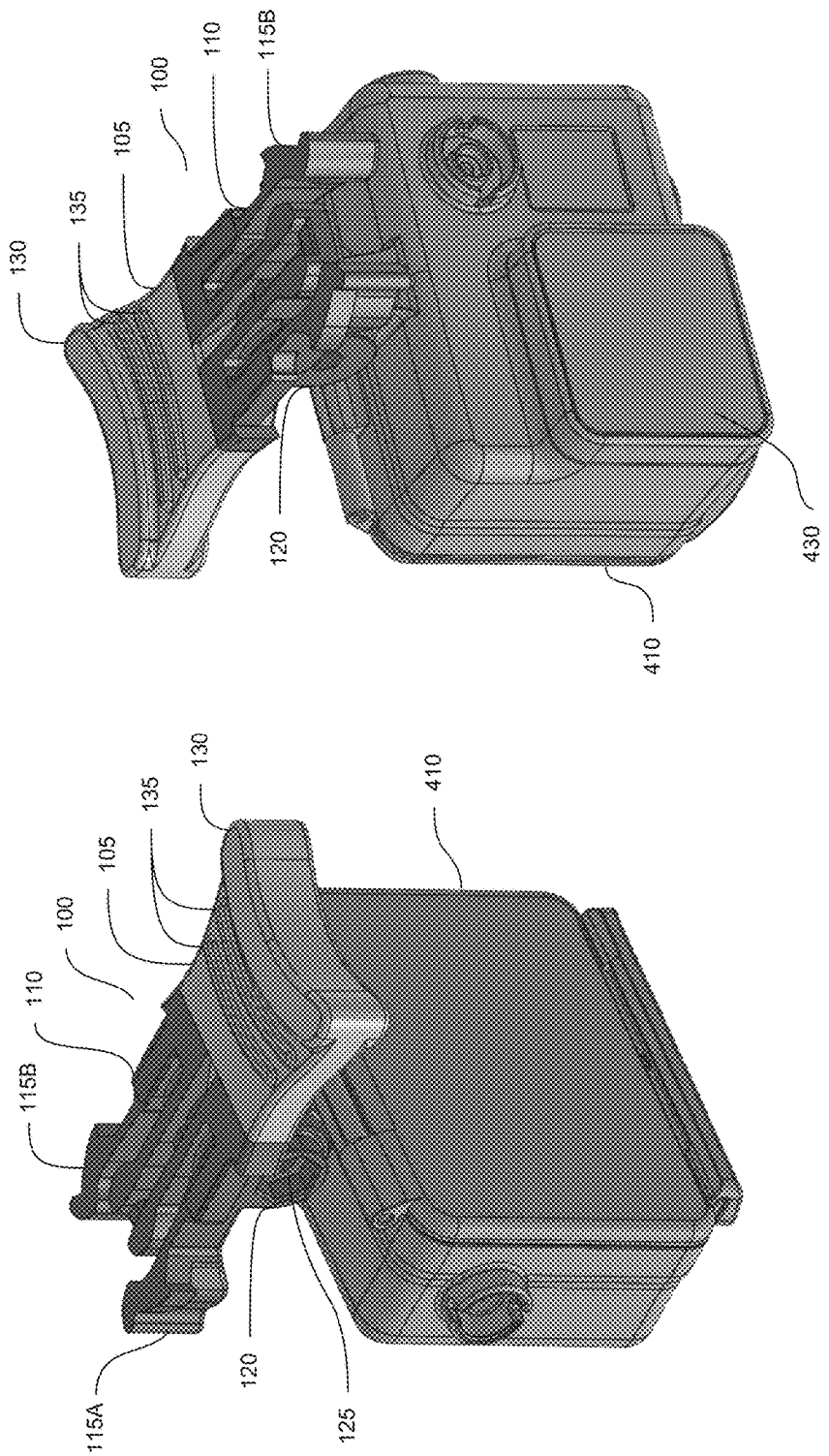
FIGS. 5A and 5B illustrate an example embodiment of a camera coupled with a quick release bite mount.
Figure 6:
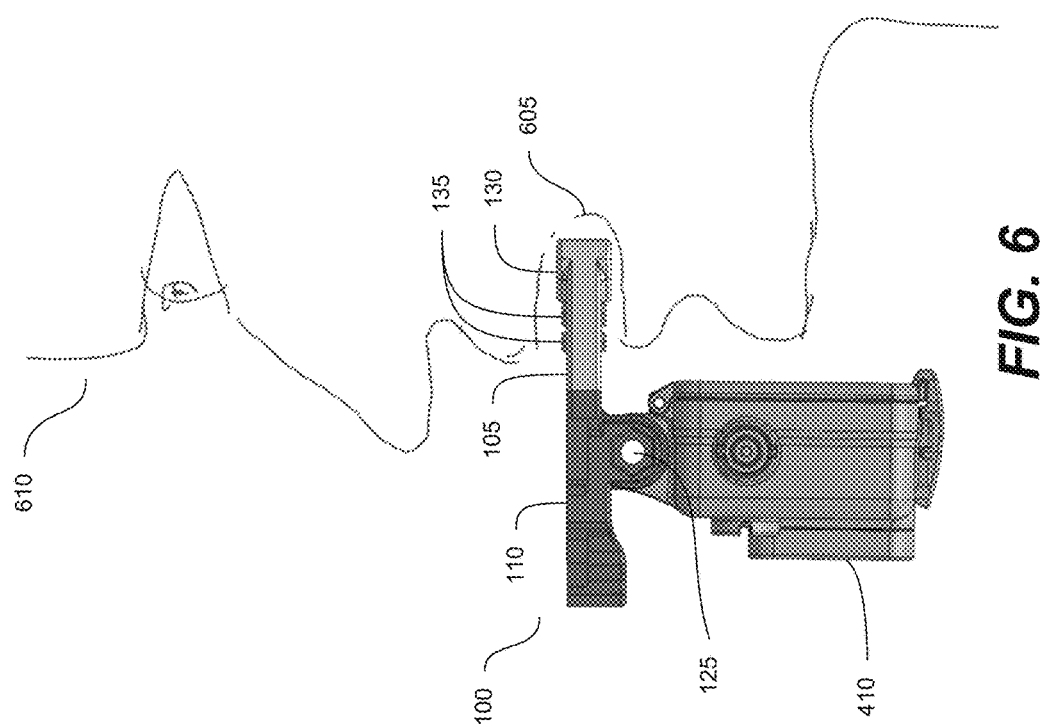
FIG. 6 illustrates one embodiment of a quick release bite mount secured by a user.

FIG. 6 illustrates one embodiment of the bite mount 100 secured by a user 610 in the upside down configuration shown in FIG. 5. Specifically, the user 610 is securing the camera 410 using the bite mount 100 using a mouth 605 of the user. In one example the user 610 places the rubber overmold 105 in their mouth 605. The rubber overmold 105 is secured by the user 610 once the user 610 clamps down on the rubber overmold 105 using their lips and/or teeth. It is note that the user 610 leverages one or more of the outer ridges 130 or inner ridges 135 to further secure the bite mount 100.

By securing the bite mount 100 as described, the camera 410 coupled with the quick release coupler portion 110 (e.g., as described in FIG. 4) also is secured. This allows the user 610 to capture image content while engaged in an activity without the user 610 needing to use their hand to secure the camera 410.

Figure 9:
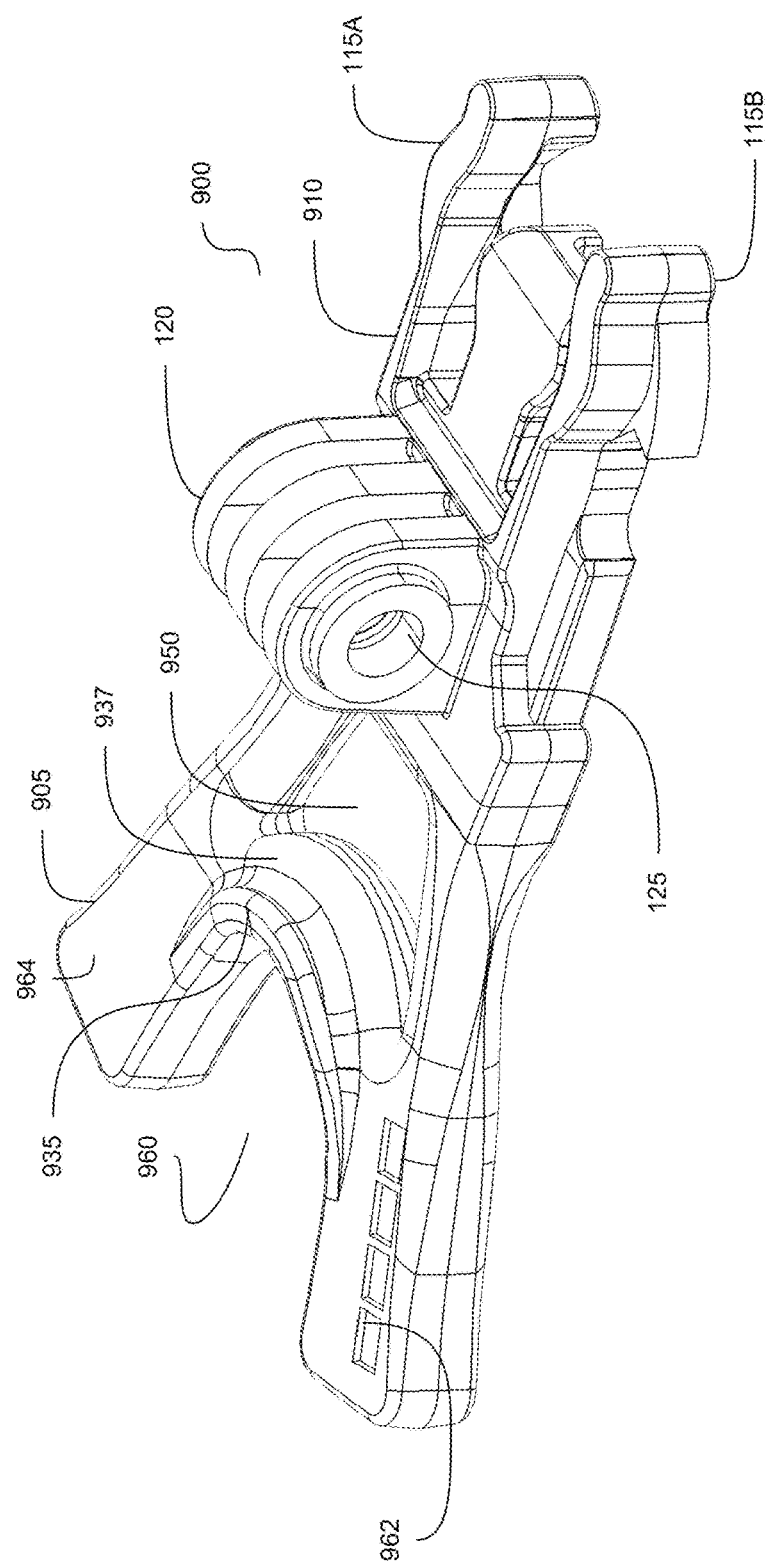
FIG. 9 illustrates another example embodiment of a quick release bite mount.

Referring now to FIG. 9, it illustrates another example embodiment of a quick release bite mount (hereinafter referred to as bite mount) 900. The bite mount 900 includes an overmold 905 and a quick release coupler portion 910, similar to the rubber overmold 105 and quick release coupler portion 110 of bite mount 100. The overmold 905, like overmold 105, comprises a receiving plate and can be made of a food safe material. For ease of discussion, the description will be provided in the context of a rubber overmold 905.

Figure 11:
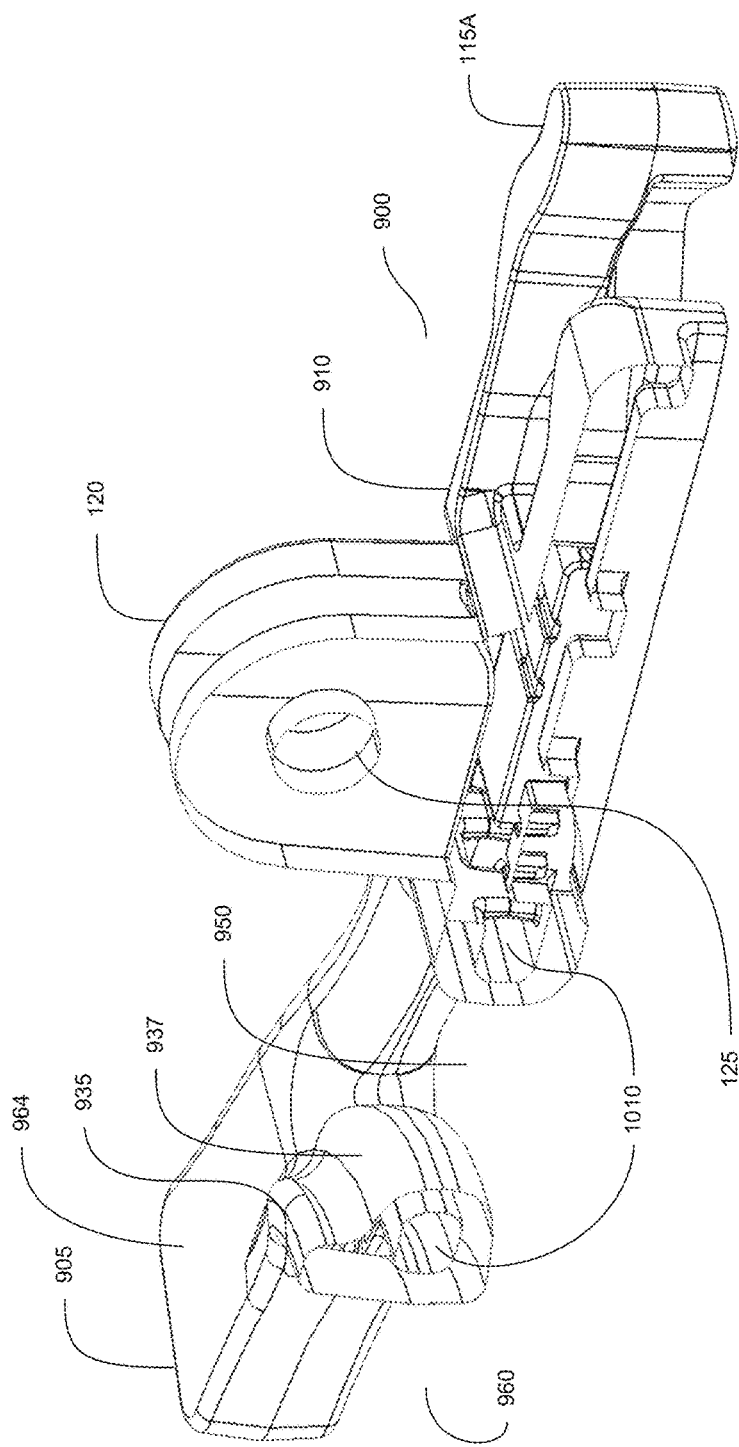
FIG. 11 illustrates another example embodiment of a vertical cross section of a quick release bite mount.
Figure 12:
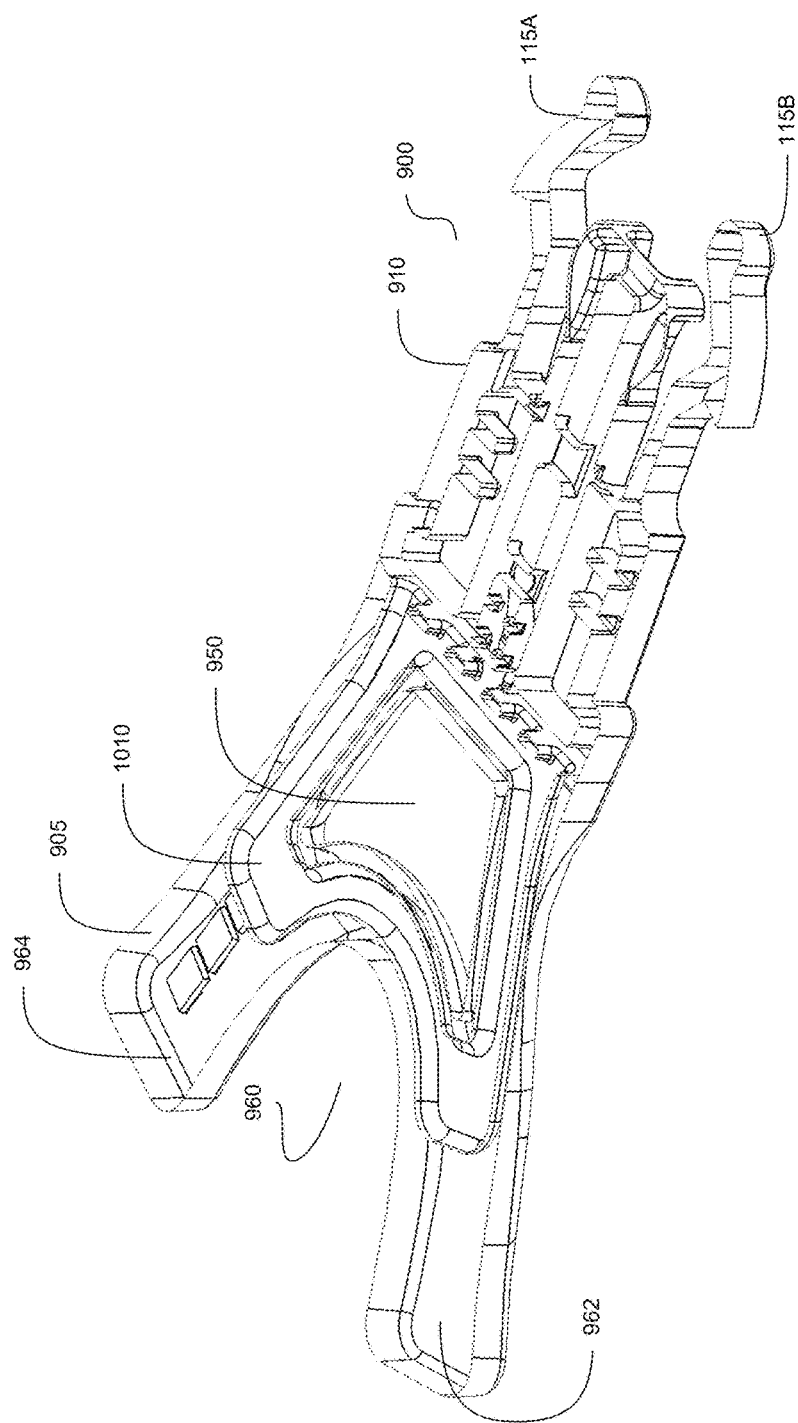
FIG. 12 illustrates another example embodiment of a horizontal cross section of a quick release bite mount.

Referring briefly to FIG. 11, it illustrates a vertical cross section of the bite mount 900. In addition, FIG. 12 illustrates a horizontal cross section of the bite mount 900. As illustrated in these drawings, note that the quick release coupler portion 910 is structured in this example as a unitary body construction, similar to the quick release coupler portion 110 of the bite mount 100. At one end 1010 the unitary body construction is where the rubber overmold 905 is structured around such end 1010. The unitary body construction 1010 of bite mount 900 can be the same as the unitary body construction 710 of bite mount 100. The rubber overmold 905 can be secured around 1010 portion of the bite mount 900 by, for example, an adhesive or some other securing options. It is noted that the rubber overmold 905 may be shaped a recessed channel that is structured or receive teeth of a user.

Referring back to FIG. 9, the quick release coupler portion 910 of the bite mount 900 includes substantially the same components as the quick release coupler portion 110 of the bite mount 100. The quick release coupler portion 910 includes a device coupler (e.g., two or more protruding fingers 120 with an opening 125 through them) and a mating coupler (e.g., arms 115A, 115B). The rubber overmold 905 of the bite mount 900 includes ridges, for example, a roof ridge 935 and a teeth ridge 937, and a breathing opening 950. The roof ridge 935 and the teeth ridge 937 can be on both the top and bottom parts of the rubber overmold 905. Similar to the bite mount 100, although the bite mount 900 illustrates two couplers (e.g., device coupler and mating coupler), the bite mount 900 can include other quick release couplers to connect that allow for releasably coupling with cameras, mounts, and/or other accessories.

Figure 10:
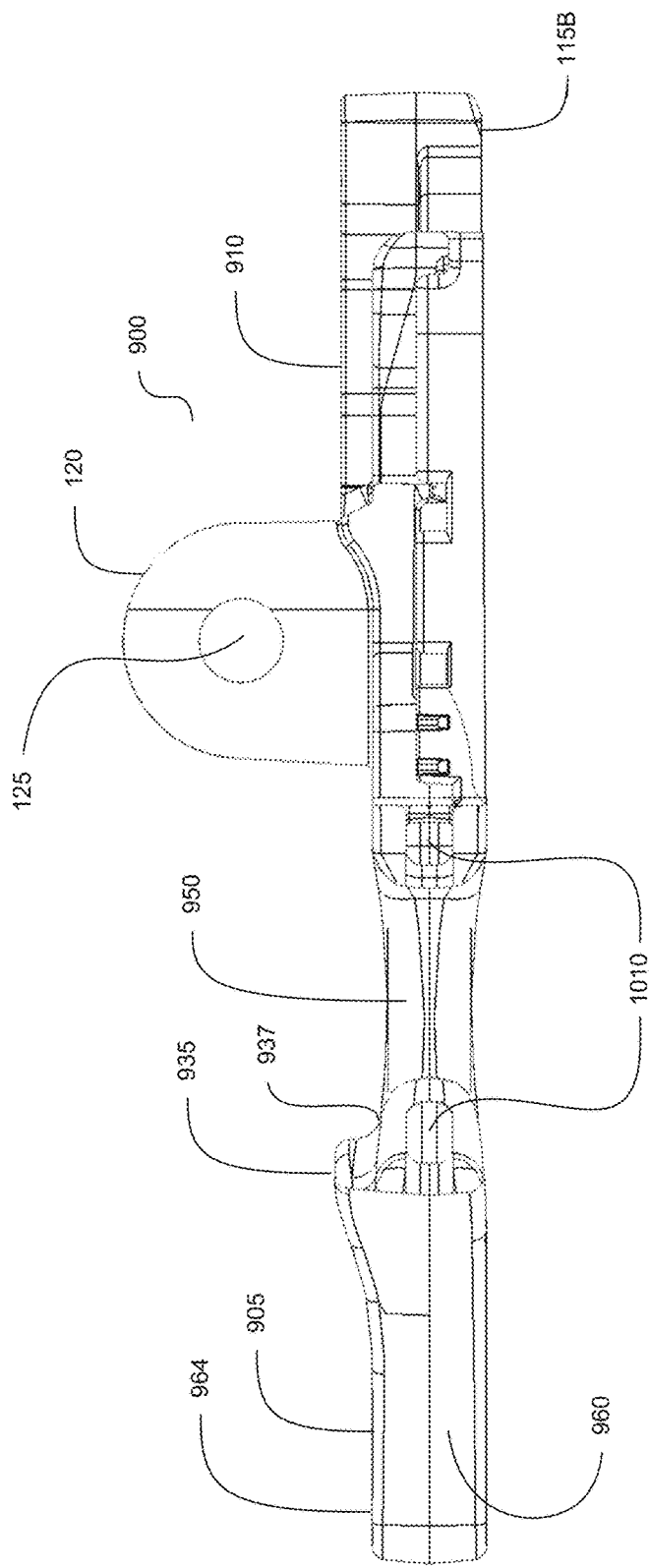
FIG. 10 illustrates another example embodiment of a side view of a quick release bite mount.

FIG. 10 illustrates another example embodiment of a side view of the bite mount 900. The rubber overmold 905 is shown surrounding one end of a unitary body quick release coupler portion 910. In this example embodiment, the overmold 905 is configured to outline the inside of a mouth of a user. Accordingly, in this example configuration the overmold 905 includes two outwardly protruding rails 962, 964 and an arc shaped edge region 960 between them. This configuration beneficially provides an opening for the user at the back of the mouth to improve breathability when the bite mount 900 is in the mouth of that user.

Further in this view, both the roof ridge 935 and the teeth ridge 937 extend above the plane of the bite mount 900. The roof ridge 935 and the teeth ridge 937 are structured such that when roof ridge 935 is within the user mouth, the user can use their teeth to grip the teeth ridge 937 of the bite mount 900 and hold the bite mount 900 in place. The roof ridge 935 is structured such that it rests inside the user mouth and the teeth ridge 937 is structured such that the user rests their teeth on it.

In one example, the height of the roof ridge 935 may be a few millimeters. The roof ridge 935 also may be a few millimeters in width. The roof ridge 935 may have a maximum height in a center position and may taper off in height from a middle position to either side of the middle position towards the out edges of the bite mount 900. For example, the roof ridge 935 may be 1 to 5 millimeters in width. Overall, the structure is small enough to fit in a user mouth, but also configured to provide gripping surfaces for the teeth using teeth ridge 937. In addition, the bite mount 900 includes a breathing opening 950. The breathing opening 950 is an open space that beneficially improves airflow in a mouth of a user when the bite mount 900 is inserted into the mouth.

In addition to improving breathability, the example bite mount 900 structure improves overall stability and balance of the mount when it is attached to the camera 410 and inserted into the mouth of the user. For example, the protruding rails 962, 964 radially extend outward from a center point of the quick release coupler portion 910 towards distal ends of the outer portion of a user jaw when inserted into the mouth of the user forming an arc shaped edge region 960. The radially extending protruding rails 962, 964 and the arc shaped edge region 960 increases the overall area of the bite mount 900 covers within the mouth of the user, reduces torque and improves balance on the bite mount 900 when loaded with a weight of the camera 410. Further, the arc shaped edge region 960 can include ridges 935, 937 to provide surfaces to which the user can interlock, for example, teeth, with the bite mount 900. Further, the ridges 935, 937 increase surface area and friction area within the mouth of the user to help augment the grip on the bite mount 900 in the mouth. These features also advantageously increase camera 410 stability as it allows the camera 410 position to remain substantially gripped (or "locked") in place with through the mouth of the user.

Additional Configuration Considerations

The bite mount 100, 900 has been described in the context of a quick release coupler portion 110, 910 configuration to releasably couple with a reciprocal mechanism to which a camera or a mount is coupled. As noted previously, the bite mount 100, 900 may include other quick release couplers to connect that allow for coupling with a camera, a mount and/or other accessories. For example, the quick release coupler portion can be an alternate buckle configuration that includes a slide on one side and a reciprocal open receiver to receive the slide. Either the slide or the reciprocal opening may include a further securing mechanism such as a spring release ball or buckle that allows the slide and reciprocal opening to say coupled together until the securing mechanism if released (e.g., depressed to thereafter uncouple the two parts).

In yet another example embodiment, the quick release coupler portion can be an alternate buckle configuration that includes a ball and socket connection. For example, quick release coupler portion on the bite mount 100, 900 can include a releasable couple that includes a socket that can receive a ball joint to which the camera is coupled. The ball and/or the socket can include a malleable friction surface that allows for the two sides to couple together securely, yet allow the ball joint to move within the socket into other positions and remain in those other positions. The configuration would allow for decoupling through the application of a force, e.g., pull apart, on the socket and ball sides.

An advantage of the configurations as disclosed includes a multi-purpose camera mount for use with an accessory such as the board mount 310 as well as use by the user without an additional mounting accessory. Moreover, when not used with another mountain accessory, the board mount advantageously allows a user to secure a camera without need to use their hands or without needing to tie down the camera to any part of the user.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives.

For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a bite mount through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A bite mount structured to be held in a mouth of a user, the bite mount comprising:
   a quick release coupler portion extending from a first end to a second end, the first end configured to couple with a reciprocal buckle component; and
   a bite portion having a first rail portion and a second rail portion, a first end of the first rail portion and a first end of the second rail portion extending from the second end of the quick release coupler portion, a second end of the first rail portion diverging away from a second end of the second rail portion, the bite portion including a ridge near the second end of the first rail portion and the second end of the second rail portion and defining an enclosed opening between the ridge and the first and second rail portions, the ridge protruding perpendicular to a plane between a top portion and a bottom portion of the bite portion and relative to the first and second rail portions.

2. The bite mount of claim 1, wherein the bite portion is comprised of one of a food-safe rubber or plastic.

3. The bite mount of claim 1, wherein the bite portion comprises a recessed channel.

4. The bite mount of claim 1, wherein the ridge is structured to engage with one or more top front teeth of the mouth of the user.

5. The bite mount of claim 1, wherein the ridge is structured to engage with one or more bottom front teeth of the mouth of the user.

6. The bite mount of claim 1, wherein the first rail portion and the second rail portion form an arc shaped edge region, the arc shaped edge region defining an un-enclosed opening adjacent to the enclosed opening, the un-enclosed opening and the enclosed opening being separated by the ridge.

7. A bite mount comprising:
   a quick release coupler portion extending from a first end to a second end, the first end including a first portion of a device coupler structured to couple with a second portion of a device coupler, the first end also including a first portion of a mating coupler structured to couple with a second portion of a mating coupler; and
   a bite portion comprising the second end of the quick release coupler portion, the bite portion having a first rail portion and a second rail portion, a distal end of the first rail portion and the second rail portion radially extending outward from a center point of the quick release coupler portion and forming an arc shaped edge region, the bite portion including a ridge near the second end of the first rail portion and the second end of the second rail portion and defining an enclosed opening between the ridge and the first and second rail portions, the ridge protruding perpendicular to a plane between a top portion and a bottom portion of the bite portion and relative to the first and second rail portions.

8. The bite mount of claim 7, wherein the bite portion is comprised of one of a food-safe rubber or plastic.

9. The bite mount of claim 7, wherein the ridge is structured to engage with one or more top front teeth of the user.

10. The bite mount of claim 8, wherein the bite portion comprises a recessed channel.

11. The bite mount of claim 7, wherein the ridge is structured to engage with one or more bottom front teeth of the user.

12. A bite mount structured to be held in a mouth of a user, the bite mount comprising:
    a quick release coupler portion extending from a first end to a second end, the first end including a first portion of a device coupler structured to couple with a second portion of a device coupler; and
    a bite portion comprising the second end of the quick release coupler portion, the bite portion having a first rail portion and a second rail portion, a first end of the first rail portion and a first end of the second rail portion extending from the second end of the quick release coupler portion, a second end of the first rail portion diverging away from a second end of the second rail portion, the bite portion including a ridge near the second end of the first rail portion and the second end of the second rail portion and defining an enclosed opening between the first ridge and the first and second rail portions, the ridge and the second ridge protruding perpendicular to a plane between a top portion and a bottom portion of the bite portion and relative to the first and second rail portions.

13. The bite mount of claim 12, wherein the bite portion comprises a recessed channel.

14. The bite mount of 12, wherein the bite portion is comprised of one of a food-safe rubber or plastic.

15. The bite mount of claim 12, wherein the ridge is structured to engage with one or more top front teeth of the mouth of the user.

16. The bite mount of claim 12, wherein the ridge is structured to engage with one or more bottom front teeth of the mouth of the user.

17. The bite mount of claim 12, wherein the first rail portion and the second rail portion form an arc shaped edge region, the arc shaped edge region defining an un-enclosed opening adjacent to the enclosed opening, the un-enclosed opening and the enclosed opening being separated by the ridge.

* * * * *